US011192586B2

(12) United States Patent
Kubota et al.

(10) Patent No.: US 11,192,586 B2
(45) Date of Patent: Dec. 7, 2021

(54) LOWER VEHICLE-BODY STRUCTURE OF VEHICLE

(71) Applicant: MAZDA MOTOR CORPORATION, Hiroshima (JP)

(72) Inventors: Harumitsu Kubota, Hiroshima (JP); Yamato Matsuda, Hiroshima (JP); Nobuyuki Nakayama, Aki-gun (JP); Kazuhisa Hatano, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 114 days.

(21) Appl. No.: 16/821,820

(22) Filed: Mar. 17, 2020

(65) Prior Publication Data

US 2020/0385056 A1    Dec. 10, 2020

(30) Foreign Application Priority Data

Jun. 7, 2019 (JP) .............................. JP2019-107389

(51) Int. Cl.
| | |
|---|---|
| *B60J 7/00* | (2006.01) |
| *B62D 21/03* | (2006.01) |
| *B60K 1/04* | (2019.01) |
| *B62D 25/02* | (2006.01) |
| *B62D 25/20* | (2006.01) |

(52) U.S. Cl.
CPC .............. *B62D 21/03* (2013.01); *B60K 1/04* (2013.01); *B62D 25/025* (2013.01); *B62D 25/2036* (2013.01); *B60K 2001/0438* (2013.01)

(58) Field of Classification Search
CPC ........... B60W 10/06; B60W 2540/103; B60W 10/08; F16H 59/20; Y02T 10/62; B62D 25/2036; B62D 25/20; B62D 25/2027; B62D 25/2018; B60K 1/04
See application file for complete search history.

(56) References Cited

U.S. PATENT DOCUMENTS

| | | | | |
|---|---|---|---|---|
| 2006/0087109 | A1* | 4/2006 | Kusu ................... | B60K 15/063 280/831 |
| 2007/0126264 | A1* | 6/2007 | Mizuma ................ | B60N 2/015 296/204 |
| 2009/0058142 | A1* | 3/2009 | Park ...................... | B62D 21/00 296/193.07 |
| 2009/0186266 | A1* | 7/2009 | Nishino ............... | H01M 50/20 429/120 |

(Continued)

FOREIGN PATENT DOCUMENTS

JP             2009083601 A        4/2009

*Primary Examiner* — Kiran B Patel
(74) *Attorney, Agent, or Firm* — Studebaker & Brackett PC (57) ABSTRACT

A lower vehicle-body structure of a vehicle includes a first cross member disposed on an intermediate portion of a front floor panel in a vehicle front-rear direction as a bridge in a vehicle width direction; a second cross member disposed in a kick-up portion between the front floor panel and a rear floor panel as a bridge in the vehicle width direction at a position in which at least a center portion in the vehicle width direction is higher than the first cross member; and a battery unit disposed below at least the front floor panel to a rear end position of the front floor panel. A high-strength portion for the front floor panel is formed on a rear end of the front floor panel on a lower end portion of the kick-up portion, and is coupled to both of a pair of left and right side sills.

20 Claims, 10 Drawing Sheets (56) References Cited

U.S. PATENT DOCUMENTS

| | | | |
|---|---|---|---|
| 2010/0237659 A1* | 9/2010 | Ishigame | B60N 2/005 296/204 |
| 2015/0042128 A1* | 2/2015 | Kowaki | B62D 25/20 296/193.07 |
| 2017/0113542 A1* | 4/2017 | Muramatsu | B60K 1/04 |
| 2019/0009832 A1* | 1/2019 | Kageyama | B60N 2/015 |
| 2019/0009834 A1* | 1/2019 | Kageyama | B62D 25/04 |
| 2019/0143802 A1* | 5/2019 | Sato | B62D 27/065 296/193.08 |
| 2020/0086928 A1* | 3/2020 | Morimoto | B62D 25/08 |
| 2020/0148027 A1* | 5/2020 | Aoki | B60H 1/246 |
| 2020/0156706 A1* | 5/2020 | Morimoto | B62D 25/2027 |
| 2020/0223303 A1* | 7/2020 | Saeki | B60K 1/04 |
| 2020/0269928 A1* | 8/2020 | Ishimoto | B62D 25/04 |
| 2020/0269930 A1* | 8/2020 | Kiyoshita | B62D 25/087 |
| 2020/0361534 A1* | 11/2020 | Matsuda | B62D 25/145 |
| 2020/0361535 A1* | 11/2020 | Matsuda | B62D 21/04 |
| 2020/0361541 A1* | 11/2020 | Matsuda | B62D 27/023 |
| 2020/0376948 A1* | 12/2020 | Yamada | H01M 50/20 |
| 2020/0381686 A1* | 12/2020 | Yamada | B60L 50/64 |
| 2020/0385058 A1* | 12/2020 | Kubota | B62D 21/02 |
| 2020/0385063 A1* | 12/2020 | Zenitani | B62D 25/04 |

* cited by examiner

LOWER VEHICLE-BODY STRUCTURE OF VEHICLE

BACKGROUND

Technical Field

The present disclosure relates to a lower vehicle-body structure of a vehicle, and particularly to a lower vehicle-body structure of a vehicle including a first cross member disposed on an intermediate portion of a front floor panel in the vehicle front-rear direction so as to serve as a bridge in the vehicle width direction, a second cross member disposed in a kick-up portion between the front floor panel and a rear floor panel so as to serve as a bridge in the vehicle width direction at a position in which at least a center portion in the vehicle width direction is higher than the first cross member, and a battery unit disposed below at least the front floor panel to a rear end position of the front floor panel.

Background Art

In general, in an electrically driven vehicle in which a battery unit serving as a power source of a motor for vehicle traveling is disposed between side frames of a front floor panel and a rear floor panel, and a floor cross member disposed on an intermediate portion of the front floor panel in the vehicle front-rear direction couples a pair of left and right side sills to each other by linearly extending in the vehicle width direction. Hence, the possibility of the side frame or the floor cross member interfering with the battery unit is low at the time of a side collision.

Meanwhile, a cross member is provided on the lower side of the kick-up portion, and end portions of the cross member in the vehicle width direction thereof are bent downward. Therefore, the performance of protecting the battery unit is not high for the floor cross member disposed on the intermediate portion of the front floor panel in the vehicle front-rear direction, and there has been room for improvement in this regard.

Incidentally, Japanese Patent Laid-Open No. 2009-83601 discloses a structure in a floor structure of an electric automobile in which a first cross member extending in the vehicle width direction is provided on a front floor panel, a second cross member extending in the vehicle width direction is provided on a kick-up portion, and a battery unit serving as a power source of a motor for vehicle traveling is disposed from the front floor panel to the lower side of the kick-up portion. However, there has been room for improvement in terms of avoiding the interference between the cross member of the kick-up portion and the battery unit at the time of a side collision.

Therefore, the present disclosure provides a lower vehicle-body structure of a vehicle capable of improving the proof stress of a rear end portion of a front floor panel against a side collision, and avoiding the interference between a cross member of a kick-up portion and a battery unit.

SUMMARY

A lower vehicle-body structure of a vehicle according to the present disclosure includes a first cross member disposed on an intermediate portion of a front floor panel in a vehicle front-rear direction so as to serve as a bridge in a vehicle width direction; a second cross member disposed in a kick-up portion between the front floor panel and a rear floor panel so as to serve as a bridge in the vehicle width direction at a position in which at least a center portion in the vehicle width direction is higher than the first cross member; and a battery unit disposed below at least the front floor panel to a rear end position of the front floor panel. In the lower vehicle-body structure, a high-strength portion for the front floor panel is formed on a rear end of the front floor panel on a lower end portion of the kick-up portion, the high-strength portion being coupled to both of a pair of left and right side sills.

According to the abovementioned configuration, the high-strength portion coupled to the left and right side sills is formed on the rear end of the front floor panel on the lower end portion of the kick-up portion, and hence the proof stress of the rear end portion of the front floor panel against the side collision load can be improved. As a result, the interference between the second cross member of the kick-up portion and the battery unit can be avoided.

In one embodiment of the present disclosure, the high-strength portion is formed by a thick plate portion. According to this configuration, the high-strength portion can be easily formed by changing the plate thickness.

In one embodiment of the present disclosure, a protruding portion coupled to a vertical wall of the kick-up portion is formed in a center of a rear end portion of the front floor panel, the thick plate portion on the rear end of the front floor panel is formed so as to be separated into a left thick plate portion and a right thick plate portion at the protruding portion, and the thick plate portions formed in the separated manner are coupled to each other via a kick-up portion vertical center wall that is a thicker plate than the protruding portion. According to this configuration, a place of the protruding portion in which the high-strength portion is interrupted by the protruding portion (so-called tunnel portion) on the rear end of the front floor panel can be easily reinforced with use of the kick-up portion vertical center wall that is strong in the up-down bending deformation.

In one embodiment of the present disclosure, rear end portions of the thick plate portions are bent upward so as to form bending portions, and the bending portions are joined and fixed to the kick-up portion vertical center wall. According to the this configuration, by forming the bending portions on the rear end portions of the thick plate portions, the strength against a side collision improves.

In one embodiment of the present disclosure, the kick-up portion vertical center wall that couples the left and right thick plate portions to each other is formed by a thick plate of which plate thickness is greater than a plate thickness of other kick-up portion vertical side walls. According to this configuration, the strength of the kick-up portion vertical center wall can be easily improved by changing the plate thickness.

In one embodiment of the present disclosure, the kick-up portion vertical center wall that couples the left and right thick plate portions to each other is coupled to the second cross member disposed above the kick-up portion vertical center wall. According to this configuration, the kick-up portion vertical center walls are coupled to the second cross member, and hence the proof stress against a side collision can be further improved.

According to the present disclosure, an advantageous effect of enabling the proof stress of the rear end portion of the front floor panel against the side collision to be improved and the interference between the cross member of the kick-up portion and the battery unit to be avoided is exhibited.

DETAILED DESCRIPTION

Improving the proof stress of a rear end portion of a front floor panel against a side collision and avoiding the interference between a cross member of a kick-up portion and a battery unit is realized by the following configuration. The configuration includes a first cross member disposed on an intermediate portion of a front floor panel in a vehicle front-rear direction so as to serve as a bridge in a vehicle width direction; a second cross member disposed in a kick-up portion between the front floor panel and a rear floor panel so as to serve as a bridge in the vehicle width direction at a position in which at least a center portion in the vehicle width direction is higher than the first cross member; and a battery unit disposed below at least the front floor panel to a rear end position of the front floor panel, in which a high-strength portion for the front floor panel is formed on a rear end of the front floor panel on a lower end portion of the kick-up portion. The high-strength portion is coupled to both of a pair of left and right side sills.

Figure 1:
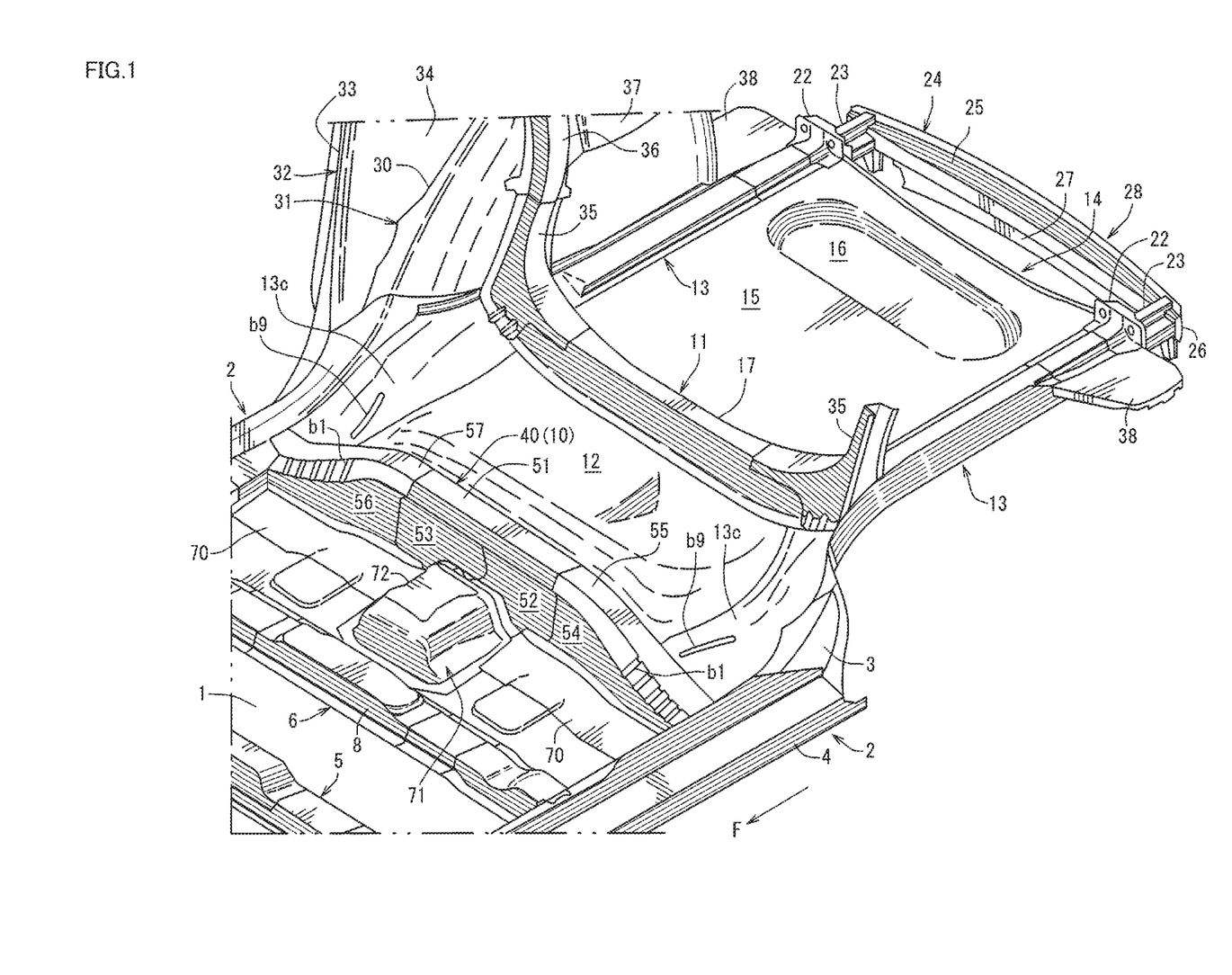
FIG. 1 is a perspective view illustrating a lower vehicle-body structure of a vehicle of the present disclosure.
Figure 3:
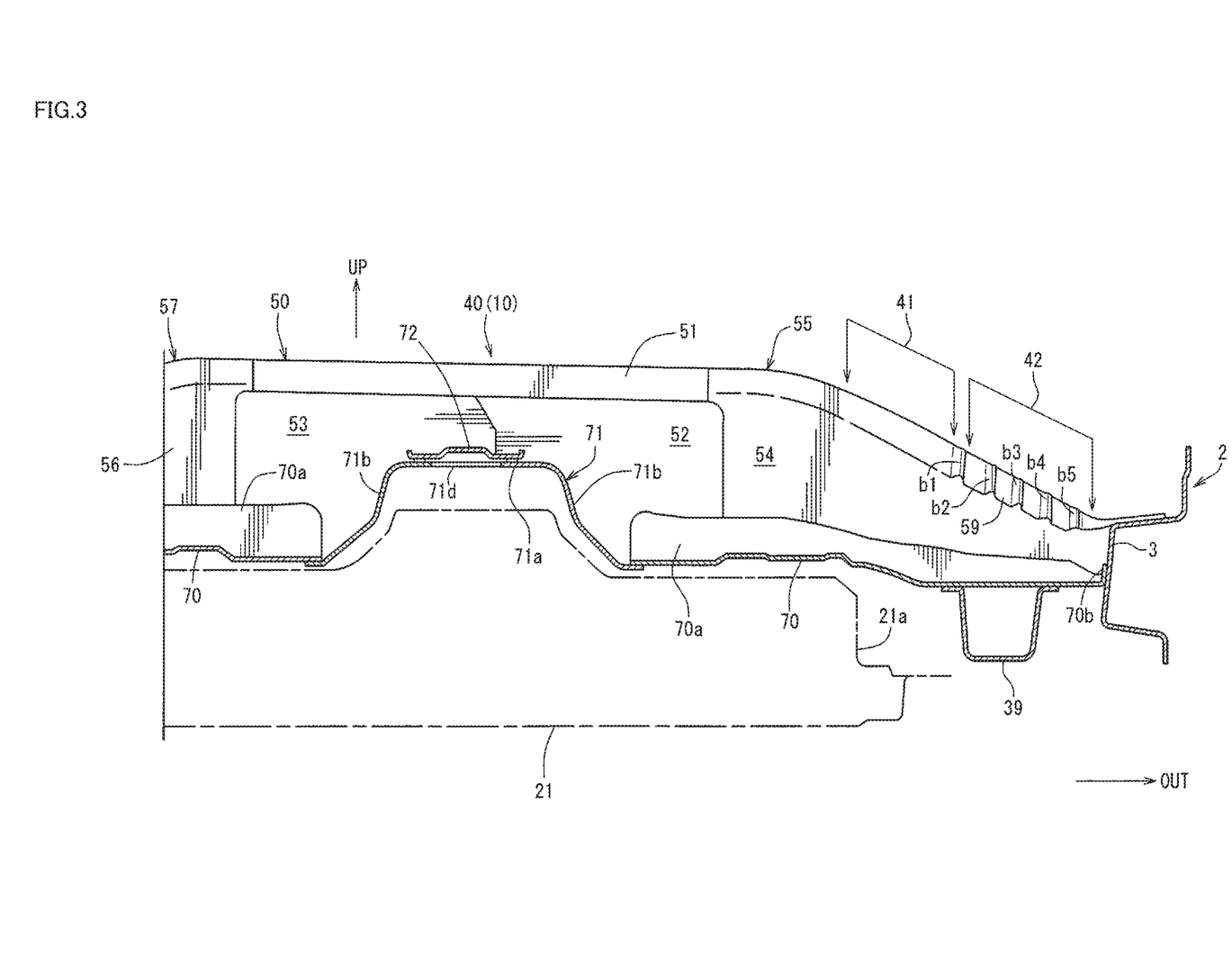
FIG. 3 is a cross-sectional view of a main part illustrating the vehicle-body structure of FIG. 1 taken along the vehicle width direction at a floor panel thick plate portion and a protruding portion.
Figure 4:
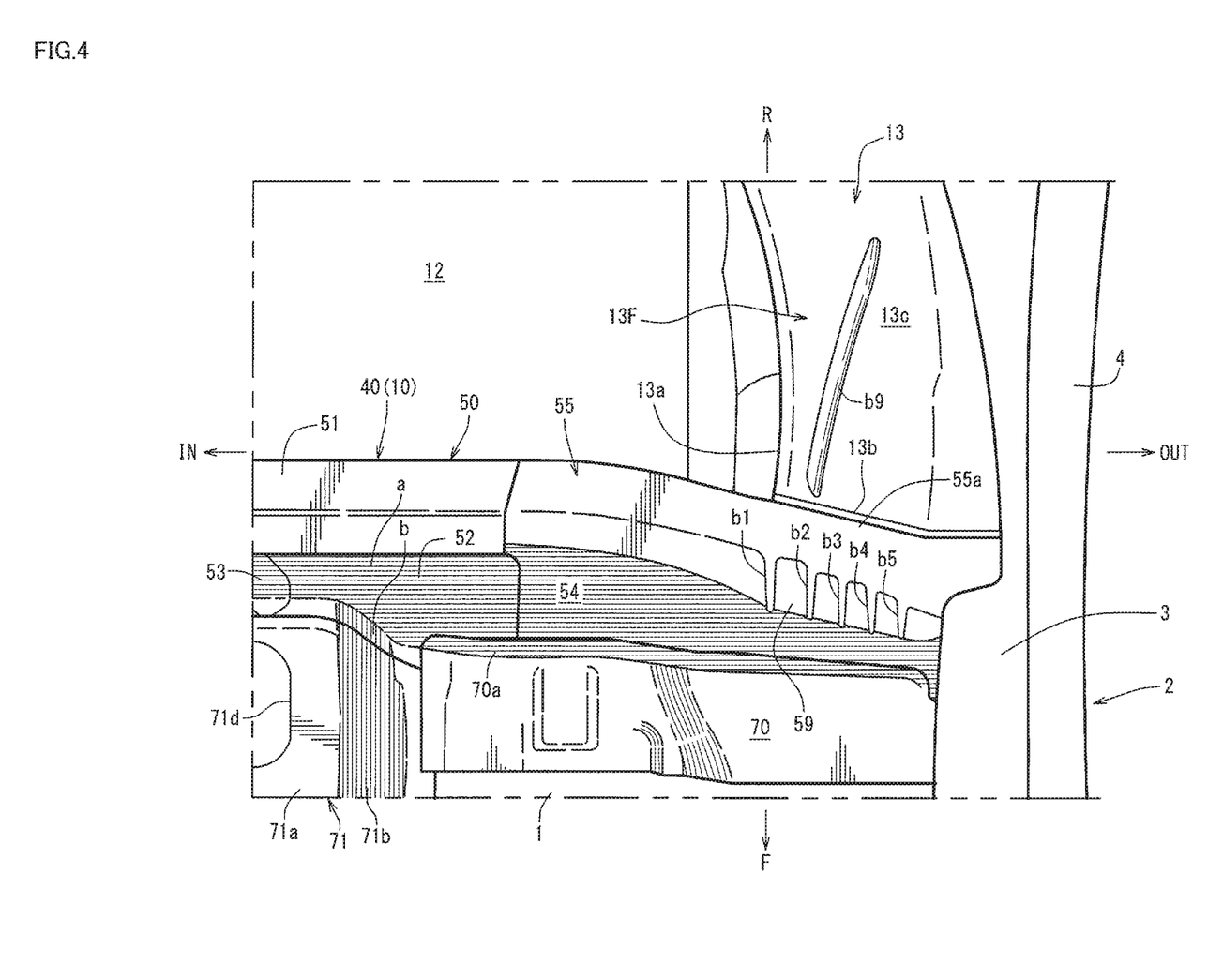
FIG. 4 is a perspective plan view of the main part in FIG. 1.
Figure 5:
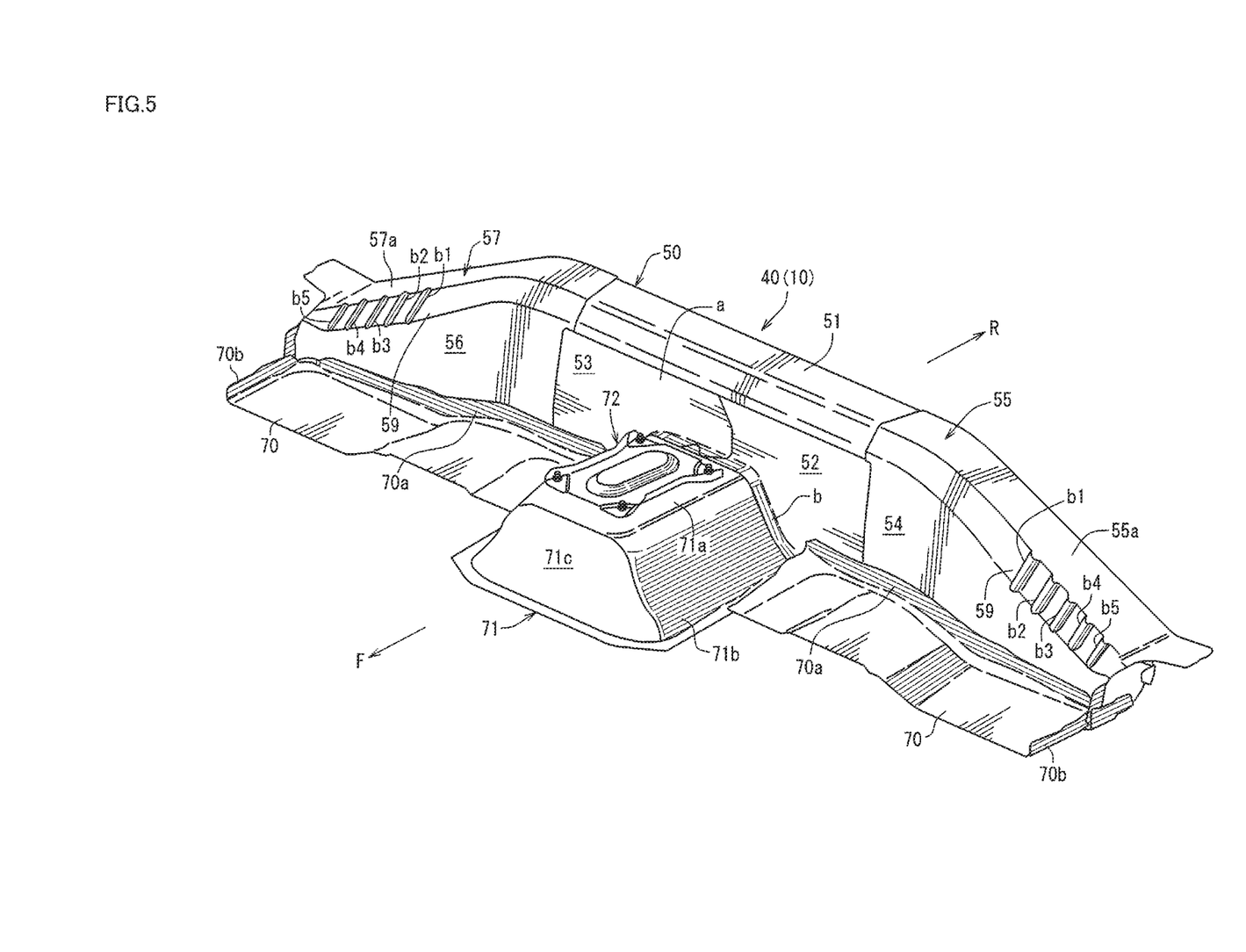
FIG. 5 is a perspective view of a cross member including the floor panel thick plate portion and the protruding portion.
Figure 6:
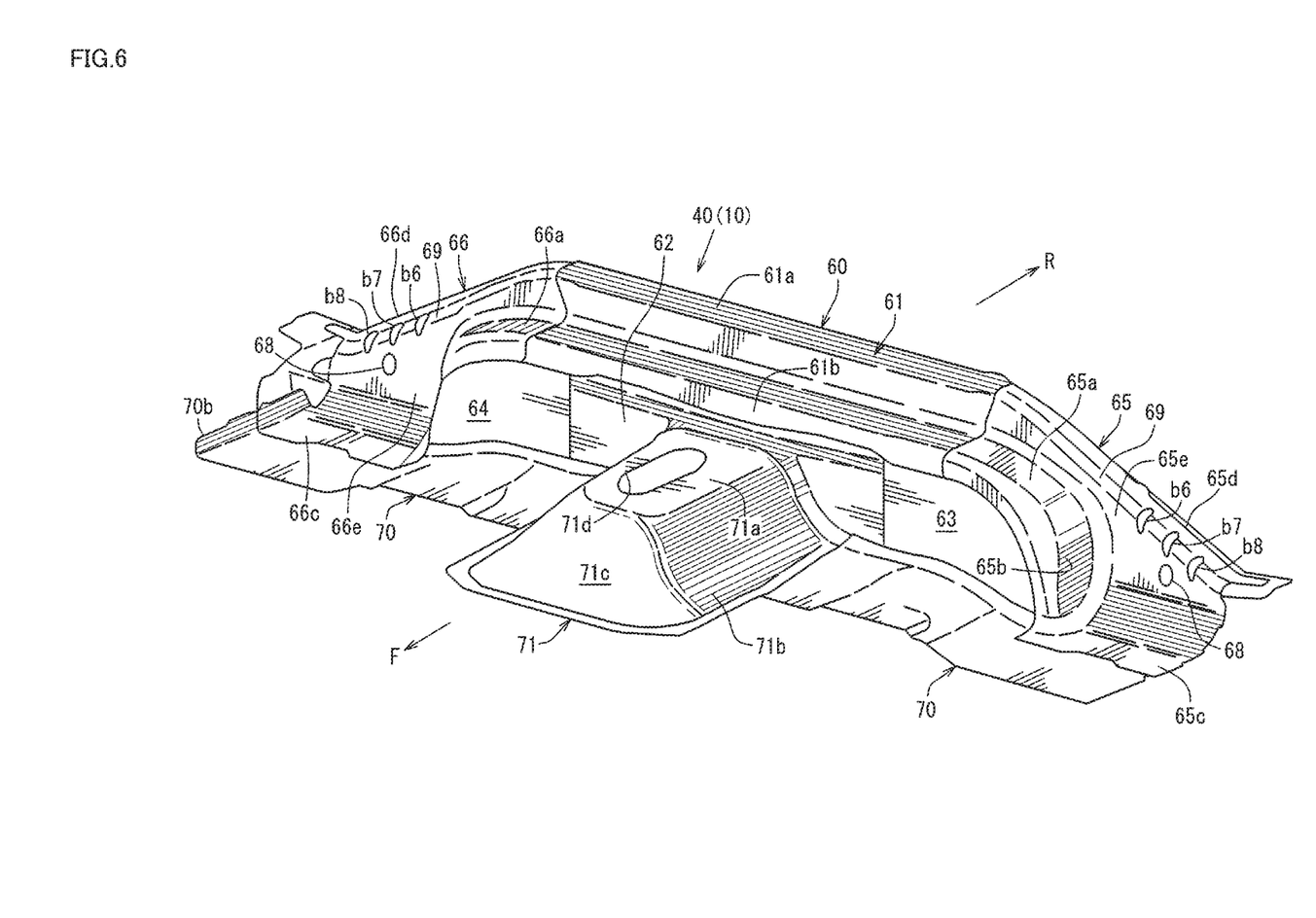
FIG. 6 is a perspective view of the cross member in a state in which a cross member upper portion is removed from FIG. 5.
Figure 7:
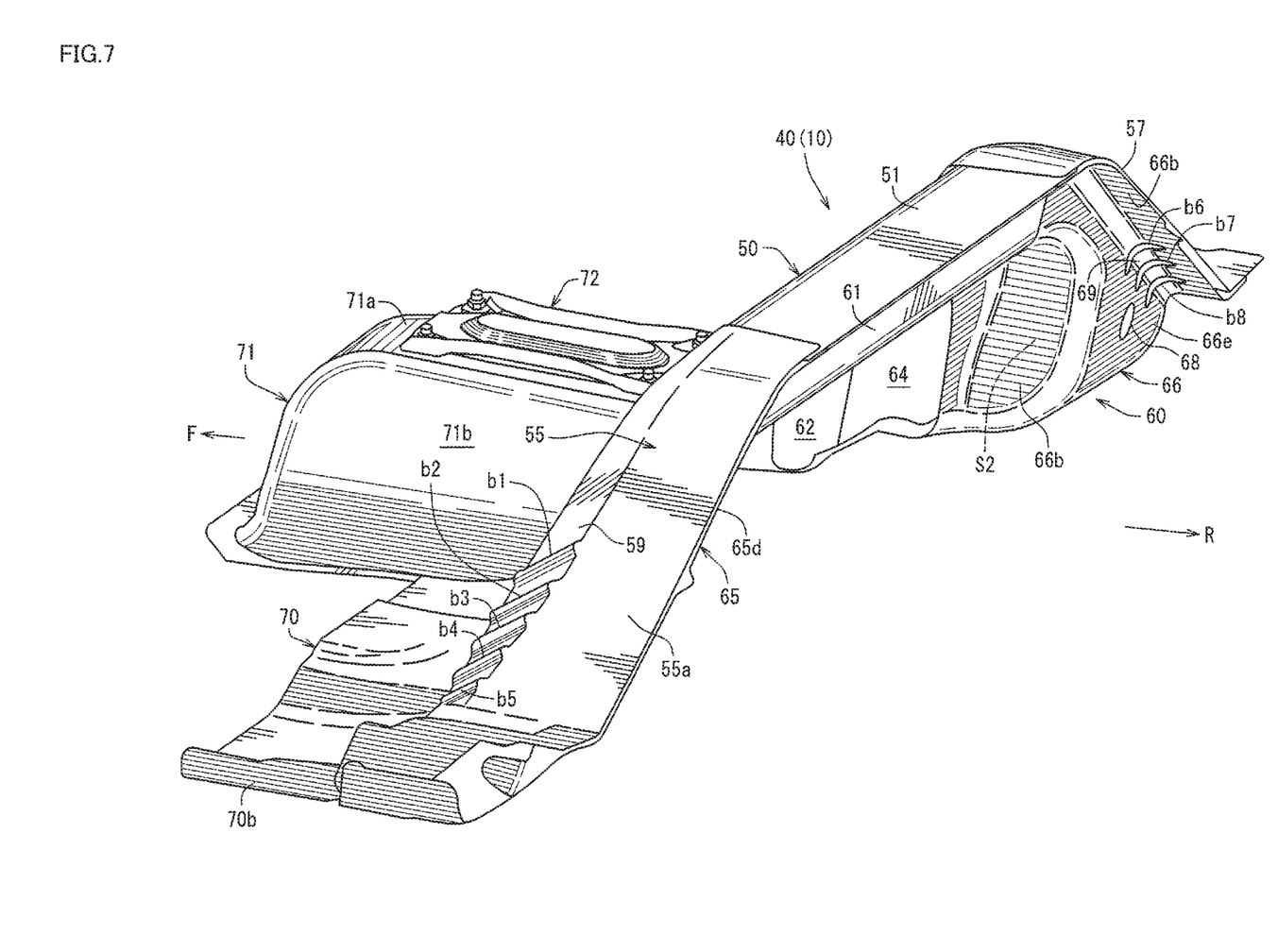
FIG. 7 is a perspective rear view of the cross member including the floor panel thick plate portion and the protruding portion.
Figure 8:
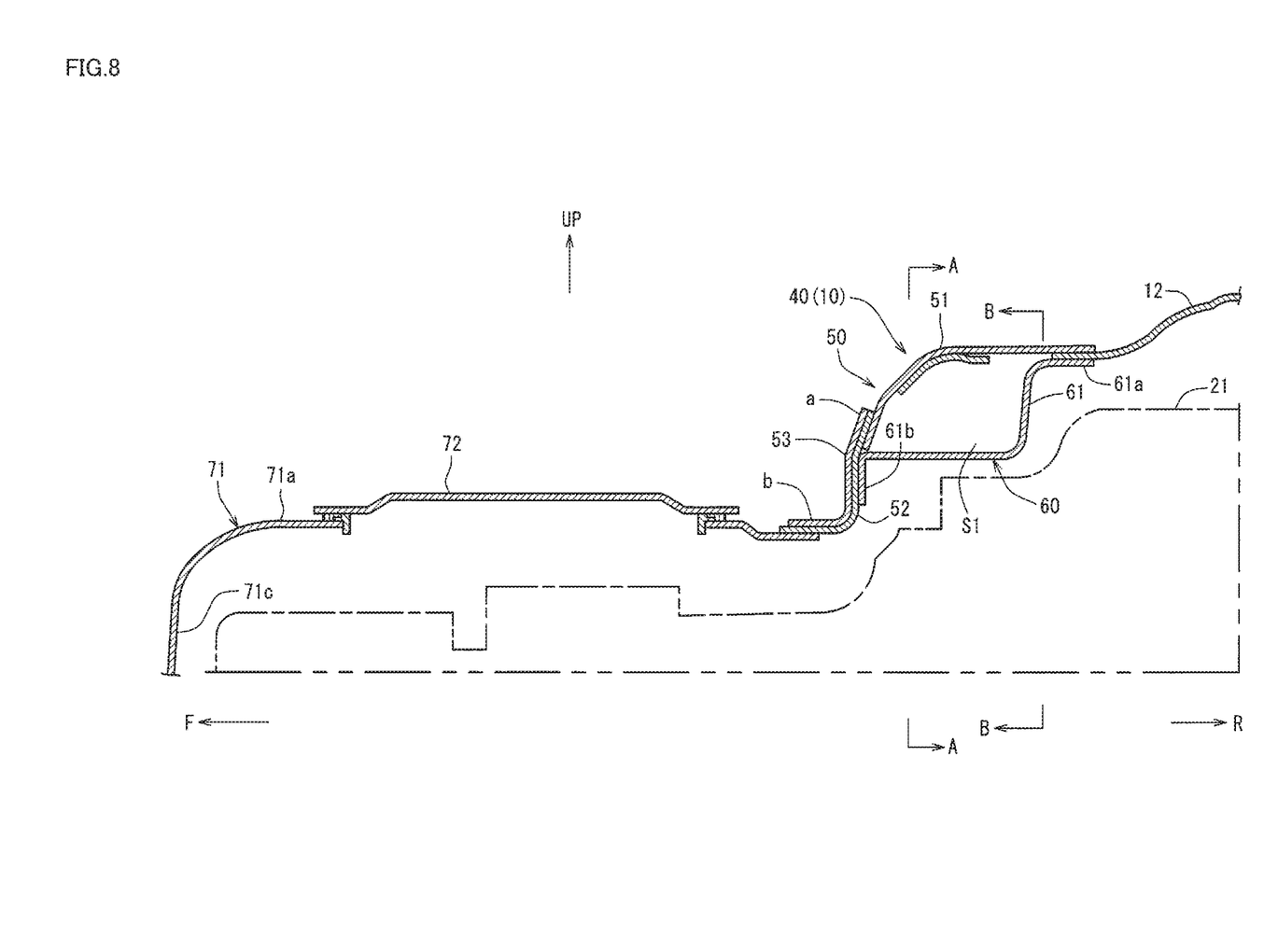
FIG. 8 is an enlarged cross-sectional view of the main part in FIG. 2.

One embodiment of the present disclosure is described in detail below with reference to the drawings. The drawings illustrate a lower vehicle-body structure of a vehicle. FIG. 1 is a perspective top view illustrating the lower vehicle-body structure, FIG. 2 is a cross-sectional view of a main part illustrating the vehicle-body structure of FIG. 1 taken along the vehicle front-rear direction at the center thereof in the vehicle width direction, FIG. 3 is a cross-sectional view of a main part illustrating the vehicle-body structure of FIG. 1 taken along the vehicle width direction at a floor panel thick plate portion and a protruding portion, FIG. 4 is a perspective plan view of the main part in FIG. 1, FIG. 5 is a perspective view of a cross member including the floor panel thick plate portion and the protruding portion, FIG. 6 is a perspective view of the cross member in a state in which a cross member upper portion is removed from FIG. 5, FIG. 7 is a perspective rear view of the cross member including the floor panel thick plate portion and the protruding portion, and FIG. 8 is an enlarged cross-sectional view of the main part in FIG. 2.

In FIG. 1, a front floor panel 1 that forms the floor surface of a vehicle interior is provided. On both of left and right side portions of the front floor panel 1 in the vehicle width direction, side sills 2 serving as vehicle body strength members extending in the front-rear direction of the vehicle are provided. As illustrated in FIG. 1 and FIG. 3, the side sills 2 each include a side sill inner portion 3, a side sill reinforcement 4, and a side sill outer portion formed by an outer plate panel of a vehicle body, and have a side sill closed cross-section extending in the front-rear direction of the vehicle.

As illustrated in FIG. 1, a front-portion cross member 5 (so-called No. 2 cross member) that couples the left and right side sills 2 and 2 to each other by extending in the vehicle width direction is provided on the upper surface of the front floor panel 1 between the pair of left and right side sills 2 and 2, and a closed cross-section extending in the vehicle width direction is formed between the front-portion cross member 5 and the front floor panel 1.

Figure 2:
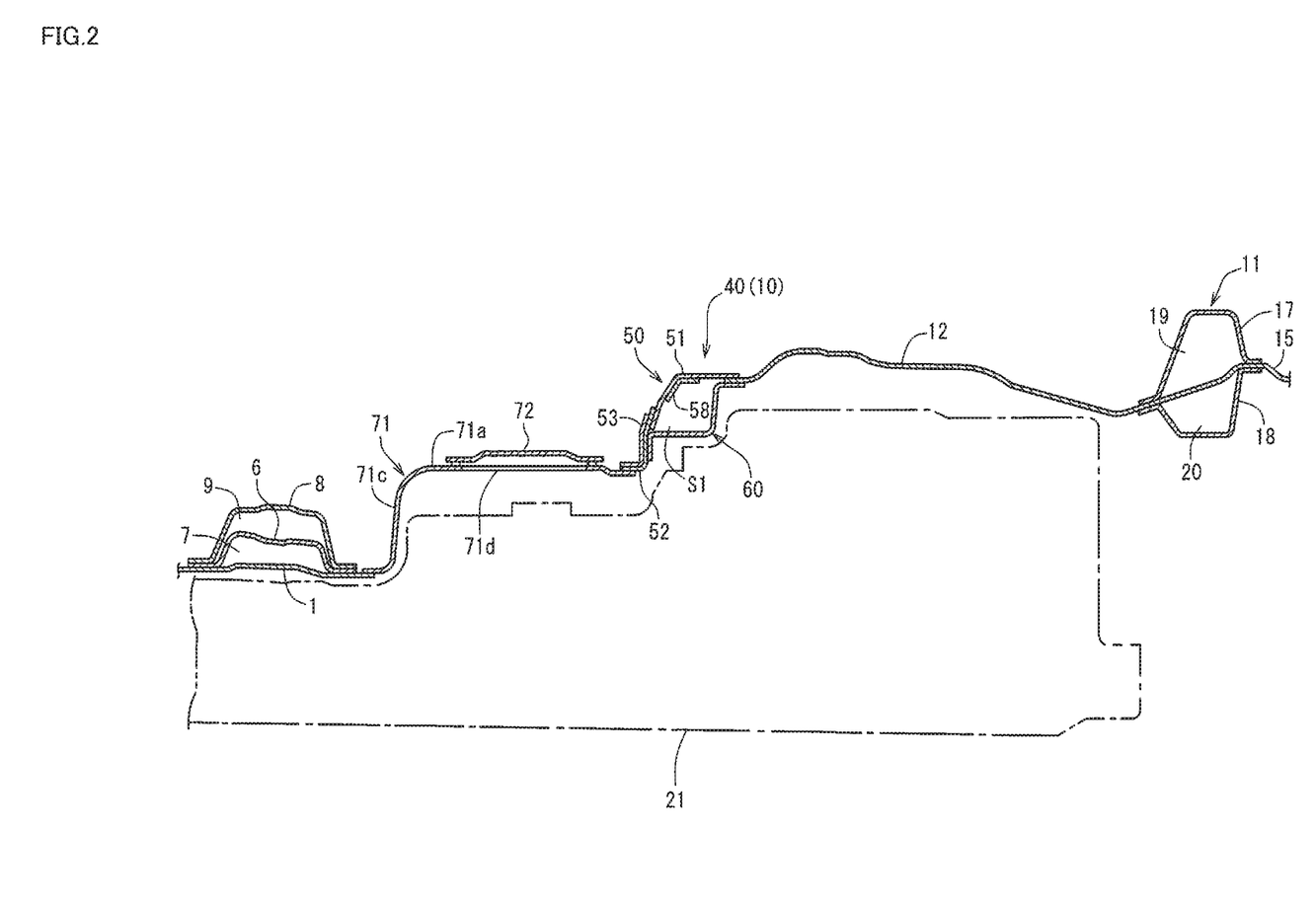
FIG. 2 is a cross-sectional view of a main part illustrating the vehicle-body structure of FIG. 1 taken along the vehicle front-rear direction at the center thereof in the vehicle width direction.

As illustrated in FIG. 1 and FIG. 2, an intermediate cross member 6 (so-called No. 2.5 cross member) that couples the left and right side sills 2 and 2 to each other by extending in the vehicle width direction is provided on the rear side of the front-portion cross member 5 so as to be parallel to the front-portion cross member 5, and a closed cross-section 7 extending in the vehicle width direction is formed between the intermediate cross member 6 and the upper surface of the front floor panel 1. As illustrated in FIG. 1 and FIG. 2, a closed cross-section expanded member 8 is mounted on the upper surface of the center portion of the intermediate cross member 6 in the vehicle width direction, and an expanded closed cross-section 9 is formed between the closed cross-section expanded member 8 and the intermediate cross member 6.

As illustrated in FIG. 1, a kick-up portion 10 that rises upward and then extends to the rear side is provided on the rear end portion of the front floor panel 1. A rear seat pan 12 on which a rear seat is installed at a place above the rear seat pan 12 is provided between the kick-up portion 10 illustrated in FIG. 1 and a rear-portion cross member 11 (so-called No. 4 cross member) illustrated in FIG. 1 and FIG. 2. On the rear side of the rear-portion cross member 11, a rear-end-portion cross member (so-called No. 4.5 cross member) (not shown) that couples a pair of left and right rear side frames 13 and 13 to each other by extending in the vehicle width direction is provided.

The rear-end-portion cross member is provided so as to be parallel to the rear-portion cross member 11. A rear floor 15 is formed from the rear-portion cross member 11 to a rear end portion 14, and a trunk recessed portion 16 projecting to the vehicle lower side is formed in the center of the rear portion of the rear floor 15 in vehicle width direction.

As illustrated in FIG. 2, the rear-portion cross member 11 (so-called No. 4 cross member) is formed by a rear-portion cross member upper portion 17 (so-called No. 4 cross member upper portion) of which cross-section has a hat-shaped profile and a rear-portion cross member lower portion 18 (so-called No. 4 cross member lower portion) of which cross-section has an inverted hat-shaped profile, and the closed cross-sections 19 and 20 extending in the vehicle width direction are formed so as to overlap each other in the up-down direction between the rear-portion cross member upper portion 17 and the rear floor 15, and between the rear-portion cross member lower portion 18 and the rear floor 15.

The vehicle of this embodiment is an electrically driven vehicle, and a battery unit 21 that supplies the power source to a motor for traveling and driving the vehicle is disposed below the rear seat pan 12 on the rear side of the front floor panel 1 and the kick-up portion 10 as illustrated in FIG. 2.

Incidentally, as illustrated in FIG. 1, rear side frames 13 extending in the front-rear direction of the vehicle are connected and fixed to both of left and right side portions of the rear floor 15. As illustrated in FIG. 1 and FIG. 4, the rear side frames 13 are provided so as to extend toward the vehicle front side from the rear end portion 14 to positions overlapping with the rear portions of the side sills 2. Note that the rear-portion cross member 11 and the rear-end-portion cross member (not shown) are provided across the pair of left and right rear side frames 13 and 13. The rear-end-portion cross member is joined and fixed to the lower surface portion of the rear floor 15.

As illustrated in FIG. 1, crash cans 23 serving as load absorbing portions are mounted on the rear ends of the rear side frames 13 via setting plates and mounting plates 22, and a rear bumper beam portion 24 extending in the vehicle width direction is laterally bridged between the pair of left and right crash cans 23 and 23.

The rear bumper beam portion 24 includes a bumper beam main body 25 of which cross-section is a sideways-hat-shaped profile, closing plates 26 that occlude the rear-portion open sides of the bumper beam main body 25, and a lower-side extending portion 27 that is joined and fixed to the closing plates 26 and extends downward across the entire width of the closing plate 26 in the vehicle width direction.

The rear bumper beam portion 24 extends in the vehicle width direction along a rear bumper (not shown), and the rear bumper beam portion 24 and the crash cans 23 and 23 serving as load absorbing portions extending from both of left and right ends of the rear bumper beam portion 24 to the vehicle front side form a rear bumper reinforcement 28.

Now, the rear side frames 13 are obtained by extending both of the left and right side portions of the rear floor 15 to the vehicle front-rear direction so that the rear ends thereof are coupled to the front ends of the crash cans 23 and 23. As illustrated in FIG. 1, on the vehicle-width-direction outer side of each of the rear side frames 13, a rear wheel well 31 formed by a rear wheel well inner portion 30 and a rear wheel well outer portion is provided.

Meanwhile, as illustrated in FIG. 1, a door opening 33 without a center pillar is formed by the side sill 2 extending in the lower portion in the vehicle front-rear direction, a quarter pillar 32 extending in the rear portion in the vehicle up-down direction, a roof side rail extending in the upper portion in the vehicle front-rear direction, a hinge pillar extending in the front portion in the vehicle up-down direction, and a front pillar that couples the front end of the roof side rail and the upper end of the hinge pillar to each other in a diagonal direction. The door opening 33 is formed so that a front door and a rear door each having a clamshell door structure are disposed.

Note that, in FIG. 1, reference numeral 34 indicates a side panel inner portion, reference numeral 35 indicates lower portion bracing members extending upward from the rear-portion cross member 11, in detail, from both of the left and right side portions of the rear-portion cross member upper portion 17 along each rear wheel well inner portion 30, reference numeral 36 indicates an upper portion bracing member further extending upward from each of the lower portion bracing members 35 along the rear wheel well inner portion 30, reference numeral 37 indicates a damper supporting portion, and reference numeral 38 indicates floor side panels formed so as to project from the rear portions of the rear side frames 13 toward the vehicle width direction outer side.

In FIG. 3, reference numeral 39 indicates a floor frame, which is joined and fixed to the lower portion of the front floor panel 1 and of which cross-section is an inverted hat-shaped profile. As illustrated in FIG. 1, the kick-up portion 10 bridges both of the pair of left and right side sills 2 and 2 in the vehicle width direction between the front floor panel 1 and the rear seat pan 12 serving as the rear floor panel, and the kick-up portion 10 is formed so as to include a closed cross-section portion (see a cross member closed cross-section S1 illustrated in FIG. 2) by a cross member 40 (so-called No. 3 cross member) described below.

As illustrated in FIG. 1, the lower vehicle-body structure of the vehicle of this embodiment includes the intermediate cross member 6 (so-called No. 2.5 cross member) that is a first cross member disposed on the intermediate portion of the front floor panel 1 in the vehicle front-rear direction so as to serve as a bridge in the vehicle width direction, and the cross member 40 (so-called No. 3 cross member) that is a second cross member disposed so as to serve as a bridge in the vehicle width direction so that at least the center portion in the vehicle width direction is at a position higher than the upper surface of the intermediate cross member 6 in the kick-up portion 10 between the front floor panel 1 and the rear seat pan 12 serving as the rear floor panel. The intermediate cross member 6 and the cross member 40 are vehicle body strength members that couple the pair of left and right side sills 2 and 2 to each other in the vehicle width direction.

In a place below at least the front floor panel 1, the battery unit 21 disposed to the rear end position of the front floor panel 1 is included. In this embodiment, as illustrated in FIG. 2, the battery unit 21 is disposed below the front floor panel 1 and the rear seat pan 12.

As illustrated in FIG. 1 and FIG. 5, on the rear end of the front floor panel 1 in the lower end portion of the kick-up portion 10, thick plate portions 70 (in detail, the floor panel thick plate portions 70) serving as high-strength portions coupled to the pair of left and right side sills 2 and 2 are provided. The thick plate portion 70 is a high-strength portion for the front floor panel 1, and the plate thickness of the thick plate portion 70 is set to be greater than the plate thickness of the front floor panel 1. By providing the thick plate portions 70, the proof stress of the rear end portion of the front floor panel 1 against the side collision load is improved, and the interference of the cross member 40 of the kick-up portion 10 and the battery unit 21 is avoided.

As illustrated in FIG. 1 and FIG. 5, in the center of the rear end portion of the front floor panel 1, a protruding portion 71 coupled to vertical walls (see a cross member upper-portion lower center left portion 52 and a cross member upper-portion lower center right portion 53 described below) of the kick-up portion 10 is formed.

As illustrated in FIG. 5, the protruding portion 71 is integrally formed by an upper surface portion 71a, left and right side surface portions 71b and 71b, and a front surface portion 71c, and the lower side and the rear side thereof are formed to be opened. As illustrated in FIG. 2, an opening portion 71d is formed in the upper surface portion 71a of the protruding portion 71, and a lid member 72 that removably covers the opening portion 71d is mounted on the upper surface portion 71a.

As illustrated in FIG. 3 and FIG. 5, the thick plate portions 70 and 70 on the rear end of the front floor panel 1 are formed so as to be separated into a left part and a right part at the protruding portion 71 provided in the center in the vehicle width direction. The cross member 40 (so-called No. 3 cross member) forming the kick-up portion 10 includes a cross member upper portion 50 illustrated in FIG. 5 and a cross member lower portion 60 illustrated in FIG. 6, and has the cross member closed cross-section S1 extending in the vehicle width direction by the cross member upper portion 50 and the ross member lower portion 60 (see FIG. 2).

As illustrated in FIG. 5, the cross member upper portion 50 includes a cross member upper-portion upper center portion 51 located on the upper center portion in the vehicle width direction, the cross member upper-portion lower center left portion 52 and the cross member upper-portion lower center right portion 53 serving as a kick-up portion vertical center wall located on the left side and the right side of the lower portion of the cross member upper-portion upper center portion 51, a cross member upper-portion side portion 55 located on the vehicle-width-direction left side of the cross member upper-portion upper center portion 51 and the cross member upper-portion lower center left portion 52 and having a kick-up portion vertical side wall 54, a cross member upper-portion side portion 57 located on the vehicle-width-direction right side of the cross member upper-portion upper center portion 51 and the cross member upper-portion lower center right portion 53 and having a kick-up portion vertical side wall 56, a cross member reinforcement 58 joined and fixed to the inner surface of the corner portion of the cross member upper-portion upper center portion 51, that is, the lower surface of the corner portion as illustrated in FIG. 2 and FIG. 8.

As illustrated in FIG. 8, the center end portions of the cross member upper-portion lower center left portion 52 and the cross member upper-portion lower center right portion 53 in the vehicle width direction serving as the kick-up portion vertical center wall are joined and fixed to each other, and the lower end portion of the cross member upper-portion upper center portion 51 is joined and fixed to the rear surface of an upper end portion a of the cross member upper-portion lower center left portion 52 and the cross member upper-portion lower center right portion 53. A lower end bending portion b of the cross member upper-portion lower center left portion 52 and the cross member upper-portion lower center right portion 53 is bent along the protruding portion 71, and the lower surface of the lower end bending portion b of the cross member upper-portion lower center left portion 52 and the cross member upper-portion lower center right portion 53 is joined and fixed to the protruding portion 71.

As illustrated in FIG. 6, the cross member lower portion 60 is obtained by integrally coupling a cross member lower-portion upper center portion 61 located on the upper center portion in the vehicle width direction, a cross member lower portion lower center portion 62 located on the lower portion of the cross member lower-portion upper center portion 61, a cross member lower-portion lower left portion 63 and a cross member lower-portion lower right portion 64 located on both of left and right sides of the cross member lower-portion lower center portion 62 in the vehicle width direction, a cross member lower-portion side portion 65 located on the vehicle-width-direction left side of the cross member lower-portion upper center portion 61 and the cross member lower-portion lower left portion 63, and a cross member lower-portion side portion 66 located on the vehicle-width-direction right side of the cross member lower-portion upper center portion 61 and the cross member lower-portion lower right portion 64.

As illustrated in FIG. 8, an upper end bending portion 61a of the cross member lower-portion upper center portion 61 is welded together with the front end portion of the rear seat pan 12 and the rear end portion of the cross member upper-portion upper center portion 51 so that the three pieces overlap each other, and a lower end bending portion 61b of the cross member lower-portion upper center portion 61 is welded together with the cross member upper-portion lower center left portion 52 and the cross member upper-portion lower center right portion 53 so that the three pieces overlap each other.

As illustrated in FIG. 5, the thick plate portions 70 and 70 formed so as to be separated into the left part and the right part are coupled to the protruding portion 71 via the cross member upper-portion lower center left portion 52 and the cross member upper-portion lower center right portion 53 serving as a thick-plate kick-up portion vertical center wall.

As a result, a place of the protruding portion 71 in which the high-strength portion is interrupted by the protruding portion 71 (so-called tunnel portion) on the rear end of the front floor panel 1 is reinforced with use of the cross member upper-portion lower center left portion 52 and the cross member upper-portion lower center right portion 53 serving as the kick-up portion vertical center wall that is strong against the bending deformation in the up-down direction.

As illustrated in FIG. 5, bending portions 70a and 70a bending upward are integrally formed on the rear end portions of the left and right thick plate portions 70 and 70, and the bending portions 70a and 70a are joined and fixed to the cross member upper-portion lower center left portion 52 and the cross member upper-portion lower center right portion 53 serving as the kick-up portion vertical center wall. As described above, by forming the bending portions 70a on the rear end portions of the thick plate portions 70, the strength against a side collision is improved.

Now, the cross member upper-portion lower center left portion 52 and the cross member upper-portion lower center right portion 53 serving as the kick-up portion vertical center wall that couples the left and right thick plate portions 70 and 70 to each other are formed by thick plates of which plate thickness is greater than the other kick-up portion vertical side walls 54 and 56. As a result, the strength of the kick-up portion vertical center wall (see the cross member upper-portion lower center left portion 52 and the cross member upper-portion lower center right portion 53) is easily improved by simply changing the plate thickness.

As illustrated in FIG. 5 and FIG. 8, the kick-up portion vertical center wall (the cross member upper-portion lower center left portion 52 and the cross member upper-portion lower center right portion 53) that couples the left and right thick plate portions 70 and 70 to each other is coupled to the second cross member 40, in detail, the cross member upper-portion upper center portion 51 disposed above the kick-up portion vertical center wall. As a result, the proof stress against a side collision is further improved.

As illustrated in FIG. 3, the bending portions 70a of the thick plate portions 70 are joined and fixed to not only the kick-up portion vertical center wall but also to the kick-up portion vertical side walls 54 and 56. As illustrated in the same figure, side bending portions 70b rising upward are integrally formed on the outer end portions of the thick plate portions 70 in the vehicle width direction, and the side bending portions 70b are joined and fixed to the side sill inner portions 3.

Incidentally, as illustrated in FIG. 3 to FIG. 5, both of the left and right sides of the kick-up portion 10 formed by the cross member 40 (so-called No. 3 cross member) in the vehicle width direction are bent down to the lower side from vehicle-width-direction inner side positions 13a, that is, the inner ends in front portions 13F of the rear side frames 13 toward the side sills 2 and are connected to the side sills 2.

In detail, the upper surface of the cross member upper-portion upper center portion 51 is formed so as to be straight across the entire width thereof in the vehicle width direction. The portions of the cross member upper-portion side portions 55 and 57 on the vehicle-width-direction inner sides thereof are formed to be straight so as to be continuous with the cross member upper-portion upper center portion 51, and portions on the vehicle-width-direction outer sides than those portions are bent downward toward the side sills 2 so that the inner sides are high and the outer sides are low. On the upper surface of each of the cross member upper-portion side portions 55 and 57, an inner-side bending portion 41 and an outer-side bending portion 42 are formed in a continuous manner (see FIG. 3).

A deformation facilitating bead portion b1 projecting to the upper front direction and extending in the front-rear direction of the vehicle as a flexure facilitating portion for the side collision load is formed in a section on the outer side than the inner-side bending portion 41 of the kick-up portion 10 and an outer side portion 21a of the battery unit 21 and on the inner side than a vehicle-width-direction inner side position 13a (that is, the inner end) of the rear side frame 13, or a section that is substantially the same as the inner end.

As a result, at the time of a side collision of the vehicle, the deformation facilitating bead portion b1 serving as the flexure facilitating portion on the outer side of the inner-side bending portion 41 bends as a bending starting point before the inner-side bending portion 41 of the kick-up portion 10. The protruding amount (so-called overhang) of the place on the vehicle-width-direction outer side of the deformation facilitating bead portion b1 is reduced, and the interference with the battery unit 21 is suppressed.

Figure 9:
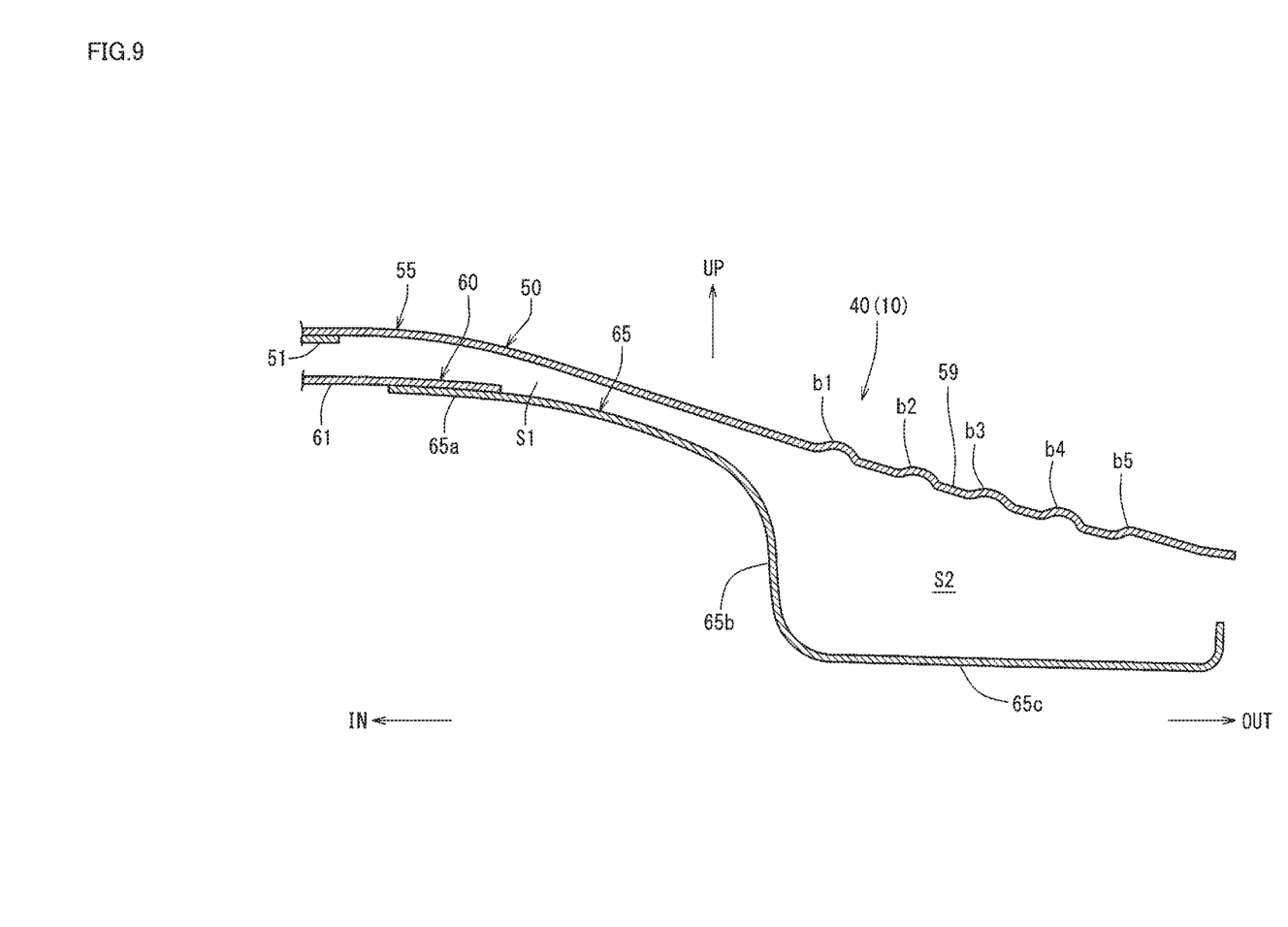
FIG. 9 is a cross-sectional arrow view taken along line A-A in FIG. 8.
Figure 10:
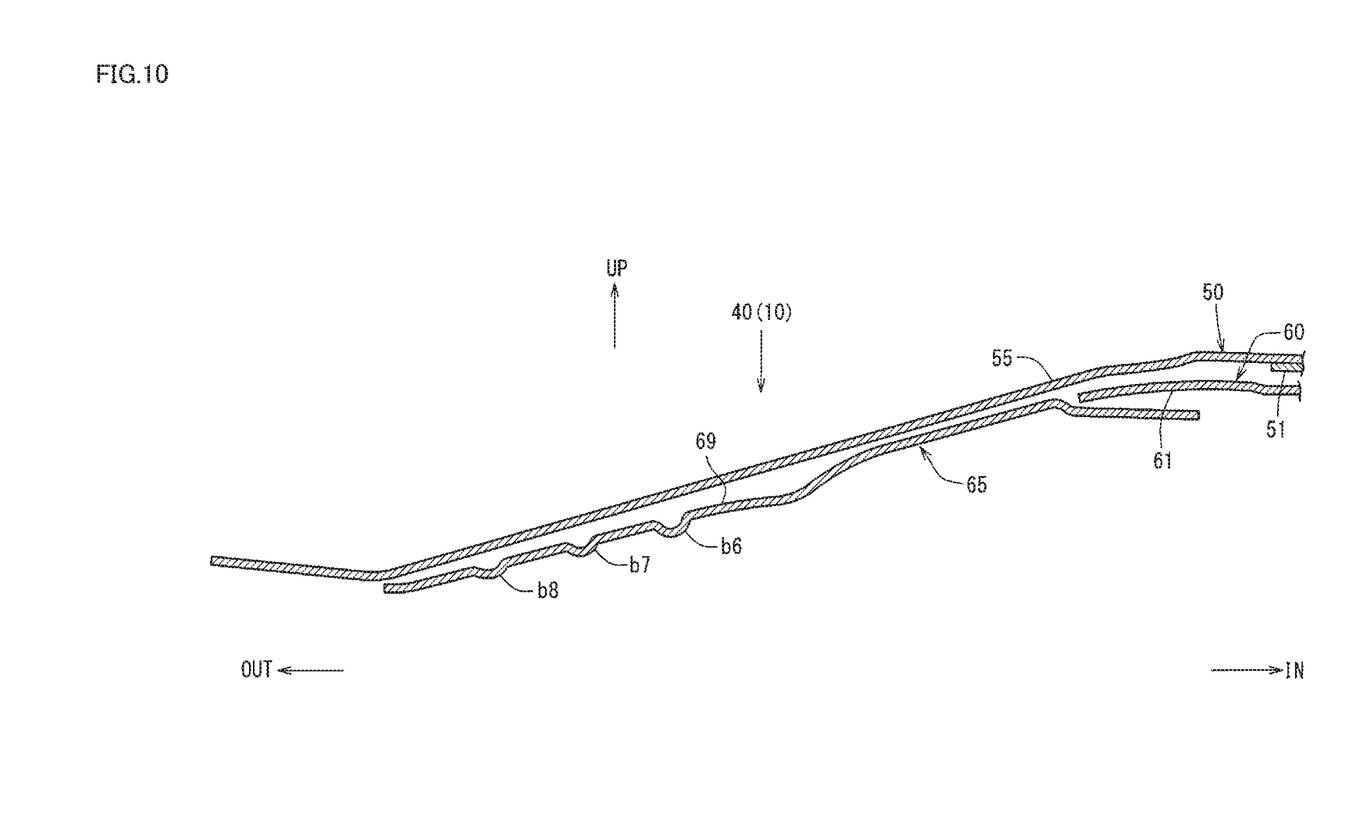
FIG. 10 is a cross-sectional arrow view taken along line B-B in FIG. 8.

FIG. 9 is a cross-sectional arrow view taken along line A-A in FIG. 8, and FIG. 10 is a cross-sectional arrow view taken along line B-B in FIG. 8. As illustrated in FIG. 7 and FIG. 9, the cross member closed cross-section S1 of the kick-up portion 10 has an expanded portion S2 in which both of left and right end portions in the vehicle width direction are expanded to the lower side with respect to the center thereof.

In other words, as illustrated in FIG. 6, FIG. 7, and FIG. 9, in the cross member lower-portion side portions 65 and 66 forming the cross member lower portion 60, hanging walls 65b and 66b extending downward from halfway portions in the vehicle width direction facing the inner-side bending portion 41 in upper walls 65a and 66a are formed, bottom walls 65c and 66c extending from the lower ends of the hanging walls 65b and 66b in the vehicle width direction are formed, upper end walls 65d and 66d inclined in a shape of which inner side is high and outer side is low so as to each correspond to the inner-side bending portion 41 and the outer-side bending portion 42 are provided, vertical walls 65e and 66e that integrally couple the walls 65a, 65b, 65c, and 65d to each other and 66a, 66b, 66c, and 66d to each other in the up-down direction are provided. As a result, on both of the left and right end portions of the cross member upper portion 50 and the cross member lower portion 60 in the vehicle width direction, the expanded portion S2 (in detail, the expanded closed cross-section) expanded to the lower side with respect to the cross member closed cross-section S1 on the center side thereof is formed.

By the left and right vertical walls 65e and 66e located on the rear surface of the expanded portion S2, front ends 13b of the rear side frames 13 are received (see FIG. 4). A second deformation facilitating bead portion is formed above the expanded portion S2. In other words, as illustrated in FIG. 4 and FIG. 5, on the cross member upper portion 50 side, a plurality of second deformation facilitating bead portions b2, b3, b4, and b5 projecting to the upper front side are formed in positions corresponding to the outer-side bending portions 42 of the cross member upper-portion side portions 55 and 57. As illustrated in FIG. 6 and FIG. 7, on the cross member lower portion 60 side, a plurality of second deformation facilitating bead portions b6, b7, and b8 projecting to the lower rear side are formed in positions corresponding to the outer-side bending portions 42 of the cross member lower-portion side portions 65 and 66. By the second deformation facilitating bead portions b2 to b5 and b6 to b8 above the expanded portion S2, the expanded portion S2 easily collapses at the time of a side collision of the vehicle.

As illustrated in FIG. 5, tapered portions 59 of which front side is low and rear side is high serving as corner portions are formed between the kick-up portion vertical side walls 54 and 56 and upper walls 55a and 57a of the expanded portion S2 in the closed cross-section portion S1 of the cross member upper-portion side portions 55 and 57 so as to be continuous in the vehicle width direction. The deformation facilitating bead portion b1 and the second deformation facilitating bead portions b2 to b5 are formed in the tapered portions 59.

Similarly, as illustrated in FIG. 6, corner portions 69 and 69 continuous in the vehicle width direction are formed between the vertical walls 65e and 66e and the upper end walls 65d and 66d of the expanded portion S2 in the closed cross-section portion S1 of the cross member lower-portion side portions 65 and 66, and the second deformation facilitating bead portions b6, b7, and b8 are formed on the corner portions 69 and 69.

As described above, the deformation facilitating bead portions b1 to b5 on the cross member upper portion 50 side are formed on the tapered portions 59 serving as the corner portions, and the second deformation facilitating bead portions b6 to b8 on the cross member lower portion 60 side are formed on the corner portions 69. As a result, the tapered portion 59 and the corner portion 69 that hardly deform even at the time of a side collision are made to easily collapse.

As illustrated in FIG. 1 and FIG. 4, third deformation facilitating bead portions b9 extending in the substantially front-rear direction of the vehicle are formed on front-end-portion upper walls 13c of the rear side frames 13. As a result, a case where the upper walls of the rear side frames 13 parallelly move to the vehicle-width-direction inner side at the time of a side collision of the vehicle is suppressed by the upward bending deformation by the third deformation facilitating bead portions b9.

As illustrated in FIG. 6 and FIG. 7, the openings of opening portions 68 and 68 are formed in the vertical walls 65e and 66e on the lower side in the extending direction to the vehicle front side of the third deformation facilitating bead portions b9 projecting upward and integrally formed with the front-end-portion upper wall 13c of the rear side frame 13. As a result, the vertical walls 65e and 66e easily collapse at the time of a side collision of the vehicle at the opening portions 68 and 68.

As illustrated in FIG. 6 and FIG. 7, a plurality of the second deformation facilitating bead portions b6, b7, and b8 are formed, and the openings of the opening portions 68 and 68 are formed below an intermediate portion of the plurality of second deformation facilitating bead portions b6, b7, and b8 in the vehicle width direction, in detail, below the bead portion b7 located in the middle out of the bead portions b6 to b8 in the vehicle width direction. As a result, the deformation of the intermediate portions of the vertical walls 65e and 66e in the vehicle width direction is facilitated at the time of a side collision of the vehicle. Note that, in the drawings, arrow F indicates the vehicle front side, arrow R indicates the vehicle rear side, arrow IN indicates the inner side in the vehicle width direction, arrow OUT indicates the outer side in the vehicle width direction, and arrow UP indicates the vehicle upper side.

As described above, a lower vehicle-body structure of a vehicle of this embodiment includes: a first cross member (the intermediate cross member 6 serving as a so-called No. 2.5 cross member) disposed on an intermediate portion of a front floor panel 1 in a vehicle front-rear direction so as to serve as a bridge in a vehicle width direction; a second cross member (the cross member 40 serving as a so-called No. 3 cross member) disposed in a kick-up portion 10 between the front floor panel 1 and a rear floor panel (rear seat pan 12) so as to serve as a bridge in the vehicle width direction at a position in which at least a center portion in the vehicle width direction is higher than the first cross member (intermediate cross member 6); and a battery unit 21 disposed below at least the front floor panel 1 to a rear end position of the front floor panel 1. In the lower vehicle-body structure, a high-strength portion (thick plate portion 70) for the front floor panel 1 is formed on a rear end of the front floor panel 1 on a lower end portion of the kick-up portion 10, the high-strength portion being coupled to both of a pair of left and right side sills 2 and 2 (see FIG. 1, FIG. 2, and FIG. 5).

According to this configuration, the high-strength portion (thick plate portion 70) coupled to the left and right side sills 2 and 2 is formed on the rear end of the front floor panel 1 on the lower end portion of the kick-up portion 10, and hence the proof stress of the rear end portion of the front floor panel 1 against the side collision load can be improved. As a result, the interference between the second cross member 40 of the kick-up portion 10 and the battery unit 21 can be avoided.

In one embodiment of the present disclosure, the high-strength portion is formed by the thick plate portion 70 (see FIG. 1 and FIG. 3). According to this configuration, the high-strength portion can be easily formed by changing the plate thickness. In one embodiment of the present disclosure, a protruding portion 71 coupled to a vertical wall of the kick-up portion 10 is formed in a center of a rear end portion of the front floor panel 1, the thick plate portion 70 on the rear end of the front floor panel 1 is formed so as to be separated into a left thick plate portion and a right thick plate portion at the protruding portion 71, and the thick plate portions 70 and 70 formed in the separated manner are coupled to each other via a kick-up portion vertical center wall (the cross member upper-portion lower center left portion 52 and the cross member upper-portion lower center right portion 53) that is a thicker plate than the protruding portion 71 (see FIG. 5).

According to this configuration, a place of the protruding portion 71 in which the high-strength portion (thick plate portion 70) is interrupted by the protruding portion 71 (so-called tunnel portion) on the rear end of the front floor panel 1 can be easily reinforced with use of the kick-up portion vertical center wall (the cross member upper-portion lower center left portion 52 and the cross member upper-portion lower center right portion 53) that is strong in the up-down bending deformation.

In one embodiment of the present disclosure, rear end portions of the thick plate portions 70 are bent upward so as to form bending portions 70a, and the bending portions 70a are joined and fixed to the kick-up portion vertical center wall (the cross member upper-portion lower center left portion 52 and the cross member upper-portion lower center right portion 53) (see FIG. 5). According to this configuration, by forming the bending portions 70a on the rear end portions of the thick plate portions 70, the strength against a side collision improves.

In one embodiment of the present disclosure, the kick-up portion vertical center wall (the cross member upper-portion lower center left portion 52 and the cross member upper-portion lower center right portion 53) that couples the left and right thick plate portions 70 and 70 to each other is formed by a thick plate of which plate thickness is greater than a plate thickness of other kick-up portion vertical side walls 54 and 56 (see FIG. 5). According to this configuration, the strength of the kick-up portion vertical center wall (the cross member upper-portion lower center left portion 52 and the cross member upper-portion lower center right portion 53) can be easily improved by changing the plate thickness.

In one embodiment of the present disclosure, the kick-up portion vertical center wall (the cross member upper-portion lower center left portion 52 and the cross member upper-portion lower center right portion 53) that couples the left and right thick plate portions 70 and 70 to each other is coupled to the second cross member 40 (in detail, the cross member upper-portion upper center portion 51) disposed above the kick-up portion vertical center wall (see FIG. 5).

According to this configuration, the kick-up portion vertical center walls (the cross member upper-portion lower center left portion 52 and the cross member upper-portion lower center right portion 53) are coupled to the second cross member 40 (in detail, the cross member upper-portion upper center portion 51), and hence the proof stress against a side collision can be further improved.

Regarding the correspondence between the configuration of the present disclosure and the abovementioned embodiment, the first cross member of the present disclosure corresponds to the intermediate cross member 6 (so-called No. 2.5 cross member) of this embodiment. Similarly, the rear floor panel corresponds to the rear seat pan 12, the second cross member corresponds to the cross member 40 (so-called No. 3 cross member), the high-strength portion corresponds to the thick plate portion 70, and the kick-up portion vertical center wall corresponds to the cross member upper-portion lower center left portion 52 and the cross member upper-portion lower center right portion 53. However, the present disclosure is not only limited to the configurations of the abovementioned embodiment.

For example, in the abovementioned embodiment, a structure in which the kick-up portion vertical center wall is separated into two left and right parts, that is, the cross member upper-portion lower center left portion 52 and the cross member upper-portion lower center right portion 53 is exemplified, but the structure may be a structure that is not separated into the left part and the right part.

As described above, the present disclosure is useful for a lower vehicle-body structure of a vehicle including: a first cross member disposed on an intermediate portion of a front floor panel in a vehicle front-rear direction so as to serve as a bridge in a vehicle width direction; a second cross member disposed in a kick-up portion between the front floor panel and a rear floor panel so as to serve as a bridge in the vehicle width direction at a position in which at least a center portion in the vehicle width direction is higher than the first cross member; and a battery unit disposed below at least the front floor panel to a rear end position of the front floor panel.

What is claimed is:

1. A lower vehicle-body structure of a vehicle, comprising:
a first cross member disposed on an intermediate portion of a front floor panel in a vehicle front-rear direction so as to serve as a bridge in a vehicle width direction;
a second cross member disposed in a kick-up portion between the front floor panel and a rear floor panel so as to serve as a bridge in the vehicle width direction at a position in which at least a center portion in the vehicle width direction is higher than the first cross member, such that a high-strength portion for the front floor panel is formed on a rear end of the front floor panel on a lower end portion of the kick-up portion, the high-strength portion being coupled to both of a pair of left and right side sills and having a strength greater than a strength of another portion of the front floor panel; and
a battery disposed below at least the front floor panel to a rear end position of the front floor panel.

2. The lower vehicle-body structure of the vehicle according to claim 1, wherein
the high-strength portion is formed by a thick plate portion having a thickness greater than a thickness of at least another portion of the front floor panel.

3. The lower vehicle-body structure of the vehicle according to claim 2, wherein
a protruding portion coupled to a vertical wall of the kick-up portion is formed in a center of a rear end portion of the front floor panel;
the thick plate portion on the rear end of the front floor panel is configured into a left thick plate portion and a right thick plate portion separated at the protruding portion; and
the left and right thick plate portions formed in the separated manner are coupled to each other via a kick-up portion vertical center wall that is a thicker plate than the protruding portion.

4. The lower vehicle-body structure of the vehicle according to claim 3, wherein
rear end portions of the thick plate portions are bent upward so as to form bending portions; and
the bending portions are joined and fixed to the kick-up portion vertical center wall.

5. The lower vehicle-body structure of the vehicle according to claim 3, wherein
the kick-up portion vertical center wall that couples the left and right thick plate portions to each other is formed by a thick plate of which plate thickness is greater than a plate thickness of other kick-up portion vertical side walls.

6. The lower vehicle-body structure of the vehicle according to claim 4, wherein
the kick-up portion vertical center wall that couples the left and right thick plate portions to each other is formed by a thick plate of which plate thickness is greater than a plate thickness of other kick-up portion vertical side walls.

7. The lower vehicle-body structure of the vehicle according to claim 3, wherein
the kick-up portion vertical center wall that couples the left and right thick plate portions to each other is coupled to the second cross member disposed above the kick-up portion vertical center wall.

8. The lower vehicle-body structure of the vehicle according to claim 4, wherein
the kick-up portion vertical center wall that couples the left and right thick plate portions to each other is coupled to the second cross member disposed above the kick-up portion vertical center wall.

9. The lower vehicle-body structure of the vehicle according to claim 5, wherein
the kick-up portion vertical center wall that couples the left and right thick plate portions to each other is coupled to the second cross member disposed above the kick-up portion vertical center wall.

10. The lower vehicle-body structure of the vehicle according to claim 6, wherein
the kick-up portion vertical center wall that couples the left and right thick plate portions to each other is coupled to the second cross member disposed above the kick-up portion vertical center wall.

11. The lower vehicle-body structure of the vehicle according to claim 1, wherein
the high-strength portion has side bending portions which couple the high-strength portion to pair of left and right side sills.

12. The lower vehicle-body structure of the vehicle according to claim 1, wherein
the kick-up portion includes vertical side walls to which the high-strength portion is coupled.

13. The lower vehicle-body structure of the vehicle according to claim 3, wherein
the kick-up portion includes vertical side walls to which the high-strength portion is coupled, the vertical side walls extending from the vertical center wall in opposite directions toward the left and right side sills.

14. The lower vehicle-body structure of the vehicle according to claim 13, wherein
the vertical side walls are bent downward from the vertical center wall toward the left and right side sills.

15. The lower vehicle-body structure of the vehicle according to claim 3, wherein
the protruding portion includes an upper surface portion, and left and right side surface portions which extend from opposite ends of the upper surface portion to the thick plate portion.

16. The lower vehicle-body structure of the vehicle according to claim 15, wherein
the protruding portion further includes a front surface portion extending from the upper surface portion to the front floor panel in a direction toward the first cross member.

17. The lower vehicle-body structure of the vehicle according to claim 15, wherein
each of the left and right thick plate portions overlaps an end of one of the left and right side surface portions.

18. The lower vehicle-body structure of the vehicle according to claim 4, wherein
the kick-up portion includes vertical side walls to which the high-strength portion is coupled, the vertical side walls extending from the vertical center wall in opposite directions toward the left and right side sills, and each of the bending portions are joined and fixed to a respective one of the vertical side walls.

19. The lower vehicle-body structure of the vehicle according to claim 1, wherein
the high-strength portion is coupled to a floor frame.

20. The lower vehicle-body structure of the vehicle according to claim 1, wherein
 a protruding portion coupled to a vertical wall of the kick-up portion is formed in a center of a rear end portion of the front floor panel; and
 the high-strength portion is coupled to the floor frame at a location between the protruding portion and at least one of the left and right side sills.

* * * * *